(12) United States Patent
Maier

(10) Patent No.: US 8,279,049 B2
(45) Date of Patent: Oct. 2, 2012

(54) MULTIMEDIA DEVICE AND PROCESS FOR DATA TRANSMISSION IN A MULTIMEDIA DEVICE

(75) Inventor: Ferdinand Maier, Obertrum am See (AT)

(73) Assignee: FM Marketing GmbH, Obertrum Am See (AT)

( * ) Notice: Subject to any disclaimer, the term of this patent is extended or adjusted under 35 U.S.C. 154(b) by 399 days.

(21) Appl. No.: 12/532,863

(22) PCT Filed: Mar. 28, 2008

(86) PCT No.: PCT/EP2008/002494
§ 371 (c)(1),
(2), (4) Date: Sep. 24, 2009

(87) PCT Pub. No.: WO2008/119515
PCT Pub. Date: Oct. 9, 2008

(65) Prior Publication Data
US 2010/0109930 A1       May 6, 2010

(30) Foreign Application Priority Data

Mar. 30, 2007   (DE) .................. 10 2007 015 788

(51) Int. Cl.
*G05B 11/01*         (2006.01)
(52) U.S. Cl. ................. 340/12.22; 340/13.2; 340/13.21; 340/426.13; 340/426.14; 348/725; 348/734; 725/151; 725/152; 715/853; 715/854; 715/855; 380/274
(58) Field of Classification Search ............. 340/426.13, 340/426.14, 12.22, 13.2, 13.21; 348/725, 348/734; 725/151–152; 715/853–855; 380/274
See application file for complete search history.

(56) References Cited

U.S. PATENT DOCUMENTS

| 5,659,883 A | * | 8/1997 | Walker et al. ............... 455/59 |
| 5,758,257 A | | 5/1998 | Herz et al. |

(Continued)

FOREIGN PATENT DOCUMENTS

DE           19858310 A1       6/2000

(Continued)

OTHER PUBLICATIONS

Abstract of DE19858310; Jun. 29, 2000.

(Continued)

*Primary Examiner* — Albert Wong
*Assistant Examiner* — Ryan Sherwin
(74) *Attorney, Agent, or Firm* — Senniger Powers LLP

(57) ABSTRACT

The invention relates to a multimedia device comprising a remote control system for wirelessly controlling a multimedia appliance. In order to establish a connection between a remote control system and a multimedia appliance, the remote control system must identify itself to the multimedia appliance, by means of a hardware device, especially a SIM card. The individual user must also identify him/herself to the multimedia appliance, by means of a hardware device for detecting biometric data. The respective identification data is encoded by means of asymmetrical cryptography. During the initialization process between said two appliances, data encoded for the identification of the remote control system and each person is transmitted to the multimedia appliance and stored therein in an encoded manner. In order to establish a connection after the initialization, the corresponding data is asymmetrically encoded, in turn, from the remote control system to the multimedia appliance using another code, and is decoded in the multimedia appliance. The corresponding data stored in the multimedia appliance is also decoded and compared with the received decoded data.

11 Claims, 3 Drawing Sheets

U.S. PATENT DOCUMENTS

| | | | |
|---|---|---|---|
| 5,771,307 A | 6/1998 | Lu et al. | |
| 5,861,881 A * | 1/1999 | Freeman et al. | 715/201 |
| 5,920,642 A | 7/1999 | Merjanian | |
| 6,020,882 A | 2/2000 | Kinghorn et al. | |
| 6,130,726 A | 10/2000 | Darbee et al. | |
| 6,137,539 A | 10/2000 | Lownes et al. | |
| 6,434,171 B1 | 8/2002 | Ishida | |
| 6,690,391 B1 | 2/2004 | Proehl et al. | |
| 6,782,275 B2 * | 8/2004 | Mountain et al. | 455/558 |
| 6,914,517 B2 | 7/2005 | Kinsella | |
| 6,968,565 B1 | 11/2005 | Slaney et al. | |
| 7,039,879 B2 | 5/2006 | Bergsten et al. | |
| 7,085,566 B1 * | 8/2006 | Burchard et al. | 455/434 |
| 7,147,157 B2 * | 12/2006 | Proennecke | 235/451 |
| 7,257,712 B2 * | 8/2007 | Hughes et al. | 713/176 |
| 7,386,736 B2 * | 6/2008 | Bade et al. | 713/194 |
| 7,500,174 B2 * | 3/2009 | Sangster et al. | 714/807 |
| 2001/0007592 A1 | 7/2001 | Pu et al. | |
| 2002/0043557 A1 | 4/2002 | Mizoguchi et al. | |
| 2002/0059588 A1 | 5/2002 | Huber et al. | |
| 2003/0028872 A1 | 2/2003 | Milovanovic et al. | |
| 2003/0195969 A1 * | 10/2003 | Neuman | 709/229 |
| 2003/0233667 A1 | 12/2003 | Umipig et al. | |
| 2005/0059588 A1 | 3/2005 | Sherman et al. | |
| 2005/0149870 A1 | 7/2005 | Van Ee et al. | |
| 2005/0182710 A1 * | 8/2005 | Andersson et al. | 705/39 |
| 2007/0223706 A1 * | 9/2007 | Gantman et al. | 380/286 |
| 2008/0044029 A1 * | 2/2008 | Gilhuly et al. | 380/278 |
| 2008/0062337 A1 | 3/2008 | Maier | |
| 2009/0287930 A1 * | 11/2009 | Nagaraja | 713/171 |
| 2010/0109930 A1 | 5/2010 | Maier | |
| 2010/0146278 A1 * | 6/2010 | Maier | 713/171 |

FOREIGN PATENT DOCUMENTS

| | | |
|---|---|---|
| EP | 1602999 A1 | 12/2005 |
| WO | 0156213 A1 | 8/2001 |
| WO | 0191057 A2 | 11/2001 |
| WO | 03021915 A2 | 3/2003 |
| WO | 03043318 A1 | 5/2003 |
| WO | 2004055717 A1 | 7/2004 |
| WO | 2007022481 A2 | 2/2007 |

OTHER PUBLICATIONS

International Search Report, PCT/EP2008/004440, dated Sep. 10, 2008, 6 pages.

"Mechanism of Displaying a Menu Which Minimizes the Eye Movement," IBM Technical Disclosure Bulletin, IBM COrp. New York, US, vol. 36, No. 8, Aug. 1, 1993, pp. 25-28.

* cited by examiner

MULTIMEDIA DEVICE AND PROCESS FOR DATA TRANSMISSION IN A MULTIMEDIA DEVICE

REFERENCE TO RELATED APPLICATION

This application claims priority to German application DE 10 2007 015 788.8 filed Mar. 30, 2007, the entire disclosure of which is incorporated herein by reference.

FIELD OF THE INVENTION

The invention relates to a multimedia device in accordance with the generic part of Claim 1 as well as to a process for data transmission in a multimedia device in accordance with the generic part of Claim 2.

BACKGROUND

A device and process of this type are known from DE 198 58 310 B4.

The current apparatuses of entertainment electronics such as, e.g., television apparatuses, audio apparatuses, DVD apparatuses, satellite receivers, video recorders, set-top boxes, etc. are customarily operated by a remote control that usually communicates wirelessly with the corresponding apparatuses. All these multimedia apparatuses, which also include computers nowadays, are designated in the following as "apparatus". All these apparatuses as well as increasingly also other devices present in households such as, e.g., garage-door controls, alarm systems, heating controls, household apparatuses and kitchen apparatuses as well as telecommunication devices such as telephone, fax, internet access are currently networked to an increasing degree and controlled to the extent possible by only one single remote control. Many of the cited apparatuses can be individually configured for different users and adapted to preferences of the particular user. A few known adaptations will be explained using the example of a television receiver:
  A "child safety" can be provided that allows only selected television channels and/or allows a television reception only at predefined times;
  television habits can be preprogrammed, for example, in that a certain user views certain transmissions on certain channels on certain days of the week at certain times;
  a list of preferred television channels can be set up for each user that are preferably displayed as favorites in a selection menu;
  the individual key assignment of the keys of the remote control can be changed according to user and apparatus;
  safeties can be provided in interactive systems such as interactive television, home shopping, home banking, video on demand or the like, for example, limitations for orders of items or films, types of films (e.g., g-rated), etc.

It is necessary for the above reasons to automatically adapt the remote control to the particular user and to configure and release individual access authorization.

To this end it has already been frequently suggested that the remote control be provided with an identification device that recognizes, automatically if possible, a person with access authorization. Thus, DE 198 58 310 B4 suggests providing a fingerprint reader in the remote control that detects biometric data of the user by sensors and activates an individual operating profile upon recognition of a person with authorized access.

Even other detection apparatuses for biometric data such as a voice recognition circuit, an iris scanning apparatus and a face recognition apparatus have already been suggested (cf. WO 02/17627 A2).

The fingerprint of a person is used especially frequently for identification such as described, e.g., in US 2001/007592 A1, US 2005/0149870 A1, U.S. Pat. Nos. 5,758,257, 5,771,307, 5,920,642, 6,020,882, 6,130,726, 6,137,539, 6,914,517B2, 6,968,565B1, or WO 01/56,213 A1.

The following problems are present in all these remote controls:
  A high degree of security should be insured, which means that an apparatus can not be operated by a foreign remote control and that a new user can not be created "in an unauthorized manner";
  the hardware cost of the remote control should be as low as possible;
  the current consumption of the remote control should be as low as possible;
  the communication between remote control and apparatus should be as "tap-proof" as possible, which is especially important because there are a plurality of programmable remote controls on the market that can record, store and reproduce signals transmitted by an original remote control.

There are various suggestions for increasing security. Thus, US 2001/0007592 A1 suggests scanning a series of several fingerprints of different fingers.

EP 1 286 518 A2 suggests providing at least one key of the remote control with a fingerprint reader so a check of the authorized user is performed each time during the querying of certain functions such as, e.g., change of channel, confirmation key or the like.

In order to increase the access security the older, non-pre-published German Patent Application 10 2006 042 014 of the Applicant suggested providing, in addition to a reading device for biometric data, especially a fingerprint reader, another hardware device that identifies the remote control as such, which is realized in the concrete exemplary embodiment by a so-called SIM ("Subscriber Identity Module") card. Thus, at least the new creation of a user profile or the changing of an existing user profile is only possible if the SIM card is inserted into the remote control.

SUMMARY OF THE INVENTION

The invention has the problem of improving the initially cited multimedia device as well as the process for data transmission in a multimedia device of the initially cited type in such a manner that high transmission security of the data from the remote control to the apparatus is ensured with a low hardware cost.

This problem is solved for the multimedia device but the features indicated in Claim 1 and for the process by the features indicated in Claim 2.

Advantageous embodiments and further developments of the invention can be gathered from the subclaims.

In brief, the partial problem of the reduced hardware costs is solved in that the biometric data detected by the remote control is transferred to the apparatus and is not evaluated until it is there. The evaluation of the biometric data requires a relatively high processor power, that is present in any case in the apparatus, whereas the detection of the biometric data, for example, with a fingerprint reader requires only comparatively less computer power so that a simpler and therefore less expensive processor can be used in the remote control, which processor then also has a lower current requirement. The increased security of the data transmission is ensured by a special encoding of the data transmitted from the remote control to the apparatus with the inclusion of data stored on the SIM card.

The invention is explained in more detail in this connection in the following using an exemplary embodiment.

DETAILED DESCRIPTION OF PREFERRED EMBODIMENTS

Figure 1:
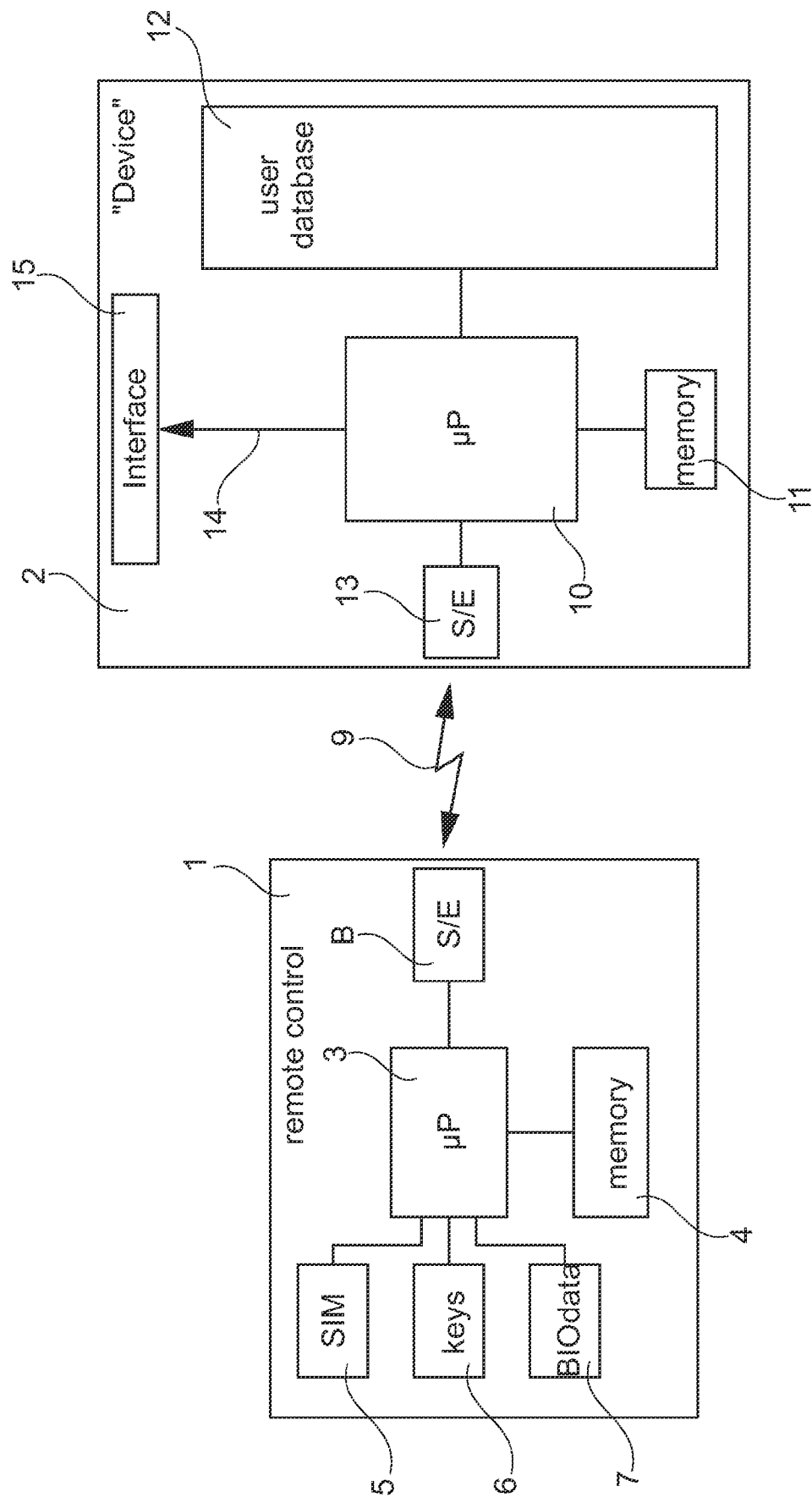
FIG. 1 shows a block schematic of a multimedia device with remote control and multimedia apparatus.

FIG. 1 shows a remote control 1 that controls an apparatus 2 that for its part can control a plurality of other apparatuses, as indicated above. In FIG. 1 only the components decisive for the control are shown.

The remote control 1 comprises a microprocessor 3, a memory 4, a SIM card reader 5, a keyboard 6 and a device 7 for detecting biometric data, in particular an apparatus for detecting a fingerprint. Furthermore, the remote control comprises a transmitting/receiving device 8, preferably for sending and receiving infrared signals. The cited components 4-8 are connected to microprocessor 3.

Memory 4 can be divided into several subgroups and comprise, for example, a read-only memory for programs and a processing memory. A SIM card to be set into the SIM card reader 5 also contains one or more memories in a known manner. Sending/receiving unit 8 communicates via a bidirectional wireless radio connection 9 with apparatus 2. Apparatus 2 also comprises a microprocessor 10, a memory 11, that also comprises a program memory and a processing memory as well as another memory that is designated here as a user databank 12 and, finally, a sending/receiving unit 13 that communicates wirelessly with sending/receiving unit 8 of the remote control.

Microprocessor 10 has an output 14 that communicates via an interface 15 with one or more apparatuses to be controlled.

Any desired number of different apparatuses to be controlled can be connected with known connections, e.g., "SCART" cable, "USB" connection or the like to interface 15.

It should be emphasized that microprocessor 3 of remote control 1 has less computer power than microprocessor 10 of the apparatus. It therefore also has less current consumption and is more economical.

The initialization phase will now be described with reference made to FIG. 2. At first, the SIM card must be inserted in a step 20 into the SIM card reader 5 of FIG. 1. The SIM card contains the following stored data:

1. A personal identification number (so-called PIN),
2. personal data of a user such as, e.g., name, date of birth, sex, credit card number, etc.,
3. a first private code (PrivK 1), with which the data cited under 2. and 3. is only accessible after the inputting of the PIN cited under 1.

Furthermore, the SIM card contains the following freely accessible data:

4. a second private code (PrivK 2),
5. a personal identification code (PIC),
6. a first public code (PubK 1) and
7. a second public code (PubK 2).

As will be explained in even more detail further below, the codes PubK 1 and PrivK 1 form a first and the codes PubK 2 and PrivK 2 form a second pair of codes that are used for encoding and decoding. A so-called asymmetric cryptography is used here in which a code of one of the cited pairs, usually the so-called public code, is used for encoding data and for decoding the other code of the pair, usually the so-called private code, is used for decoding. Thus, different codes are used for encoding and for decoding. A decoding of data with the code that was used for the encoding is not possible. The algorithms for encoding and decoding are known in principle. Refer, for example, to the asymmetric encoding algorithm RSA, the Rabin cryptosystem or the Elgamal cryptosystem. After the insertion of the SIM card the PIN is queried at first (step 21), that is inputted via the keyboard 6 (FIG. 1) and is usually a four-digit number. This clears the SIM card and the personal data, cited above and blocked by the PIN, and the private first code PrivK 1 are accessible.

The remote control then sends the first private code PrivK1 via the sending/receiving unit 8 (step 22) and the second public code PubK2 (step 24) to apparatus 2, where it is received by sending/receiving unit 13 and stored via microprocessor 10 in memory 11 (steps 22-25). Then, the biometric data of the user is read in via the fingerprint reading device 7 (step 27) and transmitted to apparatus 2 (step 28) where it is encoded with the previously received and stored public code PubK2 (step 29). In a similar manner the personal identification code PIC is queried by the SIM card and transmitted to apparatus 2 (step 30), where it is also encoded with the public code PubK 2 (step 31). Then the personal data of the user is either queried by the SIM card or inputted via the keyboard and transmitted to apparatus 2 (step 32), where it is also encoded with the second public code PubK 2 in step 33.

The second public code PubK 2, that was stored in apparatus 2 in step 25 is canceled after these procedures in step 34. A user profile is then created and stored in user databank 12 that contains the following data at first:

the non-encoded first private code PrivK 1,
the biometric data of the user encoded with the code PubK 2,
the encoded personal identification code (PIC) and the encoded personal data, each encoded with PubK 2.

In addition, the user can add other data to the personal data such as, e.g., a channel list of preferred television channels, individual key assignments of the keys of the remote control, blocks television channels, television times, etc.

The described initialization procedure is to be classified as critical to the extent that the first private code PrivK 1 is transmitted wirelessly and can therefore be "eavesdropped" if a suitable receiving apparatus is in the range of transmission. In the case of an infrared transmission the danger that a suitable receiving apparatus is in the range of transmission is, however, very small since the range of transmission is sharply limited and an undisturbed sight connection is required.

Subsequently, however, there is great security since the remaining data is encoded with the public code PubK 2, that is cancelled after the initialization in apparatus 2 and this data can not be decoded with the private first code PrivK 1.

For a further increasing of security even code PrivK 1 on the SIM card can be cancelled so that it can be designated as a "private" code that is still available only for the apparatus.

Now the normal identification process will be described in conjunction with FIG. 3, with which a connection is established between remote control 1 and the initialized apparatus 2. It is assumed that remote control 1 is ready to send and apparatus 2 is ready to receive.

In step 35 the biometric data of the user is read, for example, in that the user places a finger on the fingerprint reading apparatus 7, that reads in the corresponding image data. This image data can be compressed in a step 36, which takes place in accordance with known data compression processes such as, e.g., the Huffman code.

This compressed image data is added in step 37 to the personal identification code PIC that is read out either from the SIM card or from memory 4 (FIG. 1). This entire data packet consists of the compressed biometric data, the PIC and the code PrivK 2. This data packet is encoded with the first public key PubK 1 in step 39. In addition, a block coding and a so-called forward error correction (in short, FEC, from English "forward error correction") can be optionally carried out (step 40).

The data produced in this manner is then transmitted to apparatus 2 via radio link 9 (step 41) and received by apparatus 2 (step 42). There, this data is at first decoded with the private code PrivK 1 stored in the user databank (step 43), from which a data set with PrivK 2, PIC and the biometric data is obtained (block 44), from which the second private code PrivK 2 is extracted in step 45. The biometric data in the PIC is temporarily stored in working memory 11. The data, namely the PIC, stored in user databank 12 and encoded with the public code PubK 2 prior to being stored, the biometric data and the personal data are decoded with the now decoded and extracted second private code PrivK 2 and in the following step 47 the now decoded data from the user databank and the received data are compared with one another. The PIC is advantageously compared at first. In as far as it does not coincide, the received data does not stem from an authorized remote control, so that further processing steps can be broken off. A request for a repeated sending can optionally be generated that is displayed, for example, on a screen of the television apparatus or is transmitted to remote control 1 as a return signal via radio link 9 and displayed there.

If a comparison of the PIC yields an authorized remote control, then the biometric data is compared (step 47) and upon agreement microprocessor 10 emits a release signal at its output 14 to interface 15 (step 8). Then, a secured, authorized operation of apparatus 2 and of the other apparatuses connected to it can be carried out by remote control 1. Furthermore, the individual key assignment of the keys of remote control 1 can also be set via radio link 9 corresponding to the identified user. Also, an acknowledge signal for a successful login is transmitted via radio link 9 to the remote control which signal cancels sensitive data in memory 4 in the remote control, in particular the detected biometric data. In a similar manner the data to be compared with each other in memory 11 of the apparatus are also cancelled so that memories 11 and 4 of remote control 1 and of apparatus 2 are back in their initial state after the successful login. The normal operation between remote control 1 and apparatus 2 can then be resumed, that can also be bidirectional.

Figure 3:
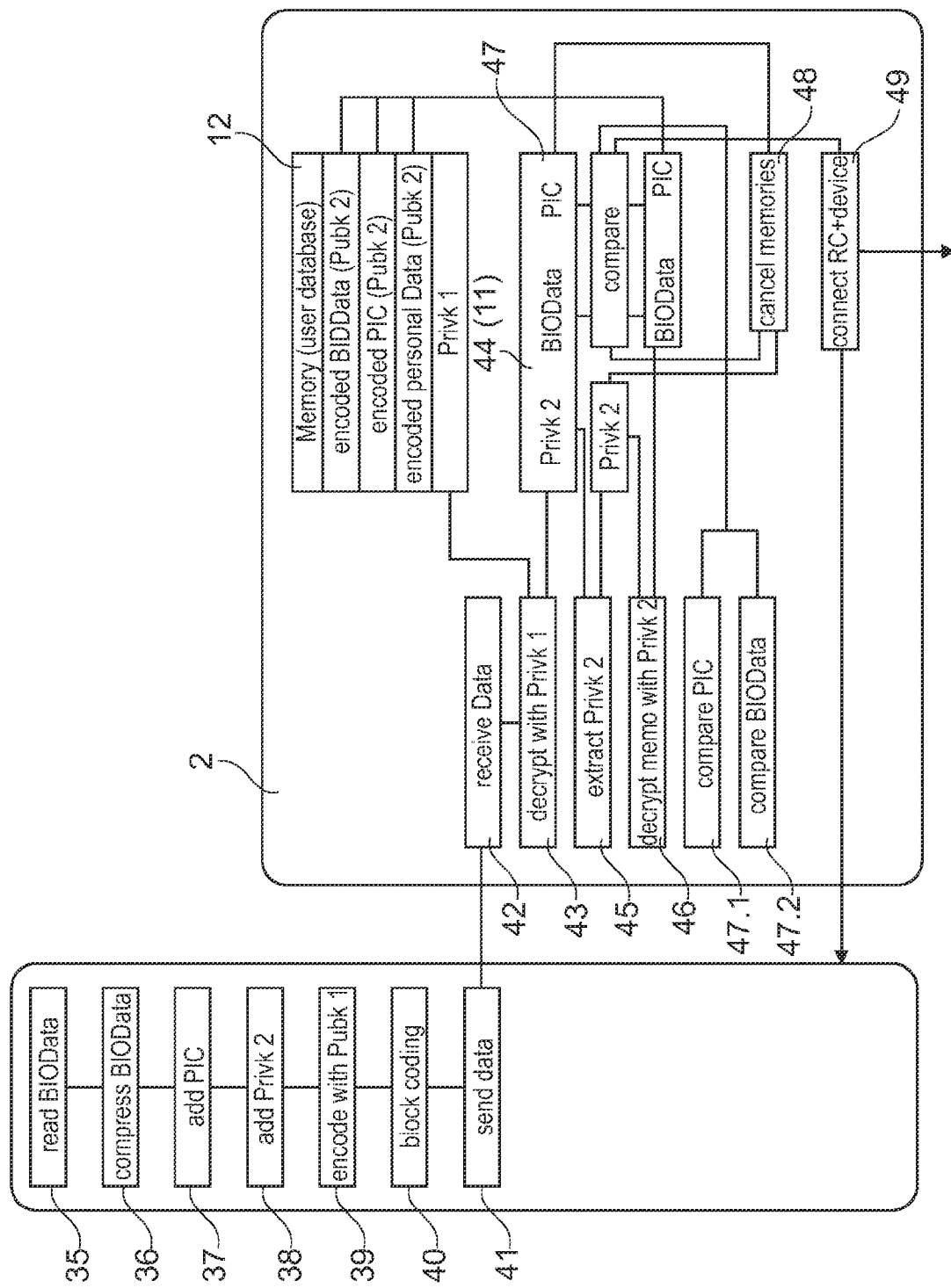
FIG. 3 shows a flowchart of the processing steps of the process in an identification process.

It can also be provided for reasons of safety that the authorized connection is interrupted after a set time and a new login is to be made in accordance with the steps described in conjunction with FIG. 3. It can also be provided that a new identification is to be made for certain control procedures relevant for security, for example, in the transmission of name, address or credit card number via connected communication apparatuses.

Figure 2:
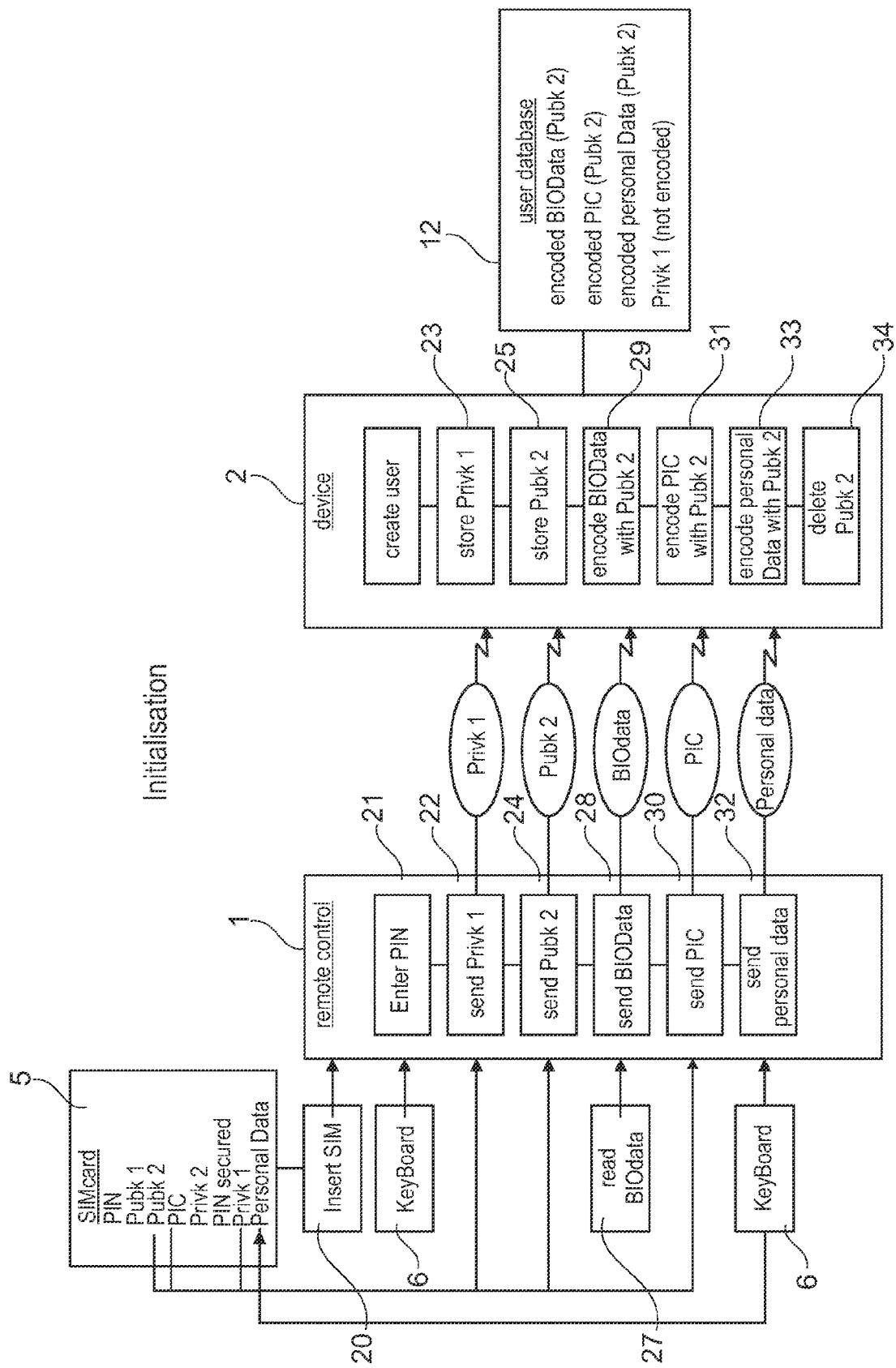
FIG. 2 shows a flowchart of the processing steps of the process in the initialization of a connection between remote control and apparatus.

In the case of the personal data of the particular user, user rights can also be given during the initialization in accordance with the processing steps described in conjunction with FIG. 2, for example, regarding the creating or changing of user profiles so that, for example, only certain persons identified via their biometric data are entitled to create new users in the user databank or to change rights assigned to certain individual users. On the other hand, it can be stipulated for other data that is also stored in the personal data that the individual user can freely change it after his identification, such as, e.g., individual key assignment of the keys of the remote control, favorites list of individual television transmitters, to the extent that they are approved.

In sum, a very high degree of security is achieved with the invention. Even if the apparatus without an SIM card gets in the hands of unauthorized persons it is not possible to access the protected biometric data and the protected personal data. Only if an authorized person has the apparatus and the SIM card is it theoretically possible to decode the protected data stored in the user databank with the first key PubK 1 stored on the SIM card. However, in order to do this the user must then have direct access to the user databank, which requires a great technical expenditure. It can be provided by the manufacturer here that the corresponding memory is protected in such a manner that either no access from the outside as possible or that its contents are automatically canceled if an attempt is made to configure the memory. In any case it is recommended to cancel the memory containing the user databank before the apparatus is given to third parties.

The invention claimed is:

1. A multimedia device with a remote control, comprising the remote control, comprising,
    a first microprocessor;
    a first hardware device for identifying the remote control;
    a second hardware device for detecting biometric data of a person; and
    a transmitting device for transmitting data;
in combination with a multimedia apparatus comprising
    a receiving device for receiving the data;
    a memory; and
    a second microprocessor;
wherein the first hardware device is a SIM card on which the following data is stored:
    a first pair of digital codes (PubK 1, PrivK 1);
    a second pair of digital codes (PubK 2, PrivK 2);
    a personal identification code (PIC); and
    personal data of at least one user;
wherein the memory of the multimedia apparatus holds the following data stored after a first initialization:
    only one code (PrivK 1) of the first pair of digital codes;
    only one code (PubK 2) of the second pair of digital codes;
    biometric data and personal data of a user, as well as the personal identification code (PIC) encoded with the only one code (PubK 2) of the second pair of digital codes;
wherein the second hardware device
    reads in biometric data of the user upon an established connection between the remote control and the multimedia apparatus;
    adds the personal identification code (PIC) and the other code (PrivK 2) of the second pair of digital codes to the biometric data, wherein the biometric data, the personal identification code (PIC), and the other code of the second pair of digital codes form a data set;
    encodes the data set with the other code (PubK 1) of the first pair of digital codes; and
    transmits the encoded data set to the multimedia apparatus;

wherein the multimedia apparatus
   receives the encoded data set;
   decodes the received, encoded data set with the stored one code (PrivK 1) of the first pair of digital codes;
   extracts from the data set the other code (PrivK 2) of the second pair of digital codes, the personal identification code (PIC) and the biometric data;
   extracts from the memory the encoded biometric data, the encoded personal data and the encoded personal identification code (PIC) and decodes them with the other code (PrivK 2) of the second pair of digital codes; and
   compares the received, decoded personal identification code (PIC) and the decoded, stored personal identification code (PIC) with one another and upon agreement compares the received, decoded biometric data and the stored, decoded biometric data with each other and only clears the multimedia apparatus upon agreement.

2. The multimedia device according to claim 1, wherein the second hardware device is configured to compress the biometric data before the forming of the data set.

3. The multimedia device according to claim 2, characterized in that the compression takes place according to the Huffman code.

4. The multimedia device according to claim 3, wherein the data set to be transmitted from the remote control to the multimedia apparatus is block-coded.

5. The multimedia device according to claim 3, wherein the data set to be transmitted from the remote control to the multimedia apparatus is provided with a forward error correction.

6. The multimedia device according to claim 2, wherein the data set to be transmitted from the remote control to the multimedia apparatus is block-coded.

7. The multimedia device according to claim 2, wherein the data set to be transmitted from the remote control to the multimedia apparatus is provided with a forward error correction.

8. The multimedia device according to claim 1, wherein the data set to be transmitted from the remote control to the multimedia apparatus is block-coded.

9. The multimedia device according to claim 8, wherein the data set to be transmitted from the remote control to the multimedia apparatus is provided with a forward error correction.

10. The multimedia device according to claim 1, wherein the data set to be transmitted from the remote control to the multimedia apparatus is provided with a forward error correction.

11. A method of authorization executed by a multimedia apparatus, said method comprising:
   storing a first code (PrivK 1) of a first pair of digital codes in a memory of the multimedia apparatus;
   storing user data encoded with a first code (PubK 2) of a second pair of digital codes, wherein the user data includes biometric data, a personal identification code (PIC) and personal data in a memory of a multimedia apparatus;
   receiving an encoded data set from a remote control, the data set having components comprising biometric data of a user of the remote control, a personal identification code (PIC) and a second code (PrivK 2) of the second pair of digital codes, wherein the data set is encoded with the second code of the first pair of digital codes (PubK 1);
   decoding the received encoded data set with the stored first code (PrivK 1) of the first pair of digital codes;
   extracting the components (PrivK 2, PIC, biometric data) from the decoded data set;
   decoding the encoded data stored in the memory of the multimedia apparatus with the extracted, decoded second code PrivK 2 of the second pair of digital codes;
   comparing the extracted identification code with the decoded, stored personal identification code and, upon agreement;
   comparing the extracted biometric data with the stored, decoded biometric data; and
   clearing the multimedia device if the comparison of the biometric data results in an agreement.

* * * * *